US012668757B2

(12) United States Patent
Ju et al.

(10) Patent No.: US 12,668,757 B2
(45) Date of Patent: Jun. 30, 2026

(54) LUBRICATING OIL VISCOSITY INDEX IMPROVER AND LUBRICATING OIL COMPOSITION CONTAINING THE SAME

(71) Applicant: DL Chemical CO., LTD., Seoul (KR)

(72) Inventors: Jin Hun Ju, Daejeon (KR); Eui Seong Baek, Seoul (KR); Myung Hyun Kim, Seoul (KR); Yong Hwan Shin, Seoul (KR); Sang Deok Mun, Daejeon (KR); Sang Eun Yoon, Daejeon (KR); Je Hyeon Wie, Daejeon (KR); Soo Hwan Park, Daejeon (KR)

(73) Assignee: DL Chemical CO., LTD., Seoul (KR)

( * ) Notice: Subject to any disclaimer, the term of this patent is extended or adjusted under 35 U.S.C. 154(b) by 0 days.

(21) Appl. No.: 18/969,644

(22) Filed: Dec. 5, 2024

(65) Prior Publication Data

US 2025/0197757 A1 Jun. 19, 2025

(30) Foreign Application Priority Data

Dec. 13, 2023 (KR) ........................ 10-2023-0180764
Oct. 29, 2024 (KR) ........................ 10-2024-0149412

(51) Int. Cl.

| | |
|---|---|
| ***C10M 143/04*** | (2006.01) |
| ***C08F 210/16*** | (2006.01) |
| ***C10M 169/04*** | (2006.01) |
| *C10N 20/04* | (2006.01) |
| *C10N 30/02* | (2006.01) |
| *C10N 40/25* | (2006.01) |

(52) U.S. Cl.

CPC ......... *C10M 143/04* (2013.01); *C08F 210/16* (2013.01); *C10M 169/041* (2013.01); *C08F 2800/10* (2013.01); *C10M 2203/003* (2013.01); *C10M 2205/024* (2013.01); *C10N 2020/04* (2013.01); *C10N 2030/02* (2013.01); *C10N 2040/252* (2020.05); *C10N 2040/255* (2020.05)

(58) Field of Classification Search

CPC ............ C10M 143/04; C10M 169/041; C10M 2203/003; C10M 2205/024; C08F 210/16; C08F 2800/10; C10N 2020/04; C10N 2030/02; C10N 2040/252; C10N 2040/255; C08L 23/08

USPC .......................................................... 508/591

See application file for complete search history.

(56) References Cited

U.S. PATENT DOCUMENTS

| | | | | |
|---|---|---|---|---|
| 7,776,805 B2 * | 8/2010 | Matsuda | C10M 107/06 | 526/348 |
| 2002/0035044 A1 * | 3/2002 | Okada | C10M 143/02 | 526/348 |
| 2003/0087772 A1 * | 5/2003 | Okada | C10M 143/02 | 508/591 |
| 2004/0058830 A1 * | 3/2004 | Kan | C10M 169/041 | 508/591 |
| 2006/0122079 A1 * | 6/2006 | Kaneshige | C10M 107/06 | 585/12 |
| 2006/0281647 A1 * | 12/2006 | Hazelton | C10M 149/04 | 508/591 |
| 2009/0291871 A1 * | 11/2009 | Chu | C10M 169/041 | 508/591 |
| 2011/0183879 A1 * | 7/2011 | Kolb | C10M 171/02 | 508/591 |
| 2012/0028867 A1 * | 2/2012 | Datta | C10M 107/06 | 508/591 |
| 2013/0203640 A1 * | 8/2013 | Matsunaga | C08L 23/16 | 508/591 |
| 2013/0281340 A1 * | 10/2013 | Kolb | C08F 210/06 | 508/591 |
| 2022/0169942 A1 * | 6/2022 | Abe | C08F 210/16 | |

FOREIGN PATENT DOCUMENTS

| | | |
|---|---|---|
| JP | 2013-518146 A | 5/2013 |
| JP | 2022-546499 A | 11/2022 |
| KR | 10-2018-0080820 A | 7/2018 |
| WO | 2023/002947 A1 | 1/2023 |

OTHER PUBLICATIONS

Extended European Search Report dated Jul. 10, 2025 in application No. 24219127.8.

* cited by examiner

*Primary Examiner* — Ellen M Mcavoy
(74) *Attorney, Agent, or Firm* — Sughrue Mion, PLLC

(57) ABSTRACT

Proposed is a lubricating oil viscosity index improver containing a liquid alpha-olefin copolymer in which ethylene and an alpha-olefin monomer having 3 or more carbon atoms are copolymerized, wherein the liquid alpha-olefin copolymer is characterized by having a weight average molecular weight (Mw) in the range of 10,000 to 120,000 g/mol, a permanent shear stability index (PSSI) of greater than 1 and less than 25, and a thickening power of greater than 2.5 cSt and less than 3.6 cSt at a temperature of 100° C. In addition, proposed is a lubricating oil composition containing the lubricating oil viscosity index improver.

18 Claims, No Drawings

LUBRICATING OIL VISCOSITY INDEX IMPROVER AND LUBRICATING OIL COMPOSITION CONTAINING THE SAME

CROSS REFERENCE TO RELATED APPLICATION

The present application claims priority to Korean Patent Application Nos. 10-2023-0180764, filed Dec. 13, 2023, and 10-2024-0149412, filed Oct. 29, 2024, the entire contents of both of which are incorporated herein by reference for all purposes.

BACKGROUND OF THE DISCLOSURE

1. Field of the Disclosure

The present disclosure relates to a lubricating oil viscosity index improver having excellent shear stability and excellent high-temperature high-shear (HTHS) viscosity properties and to a lubricating oil composition containing the same.

2. Description of the Related Art

Lubricating oils used in internal combustion engines (ICEs) not only serve to reduce friction in the mechanical parts of the engine, such as piston rings, cylinder liners, crankshaft bearings, connecting rod bearings, and valve-trains, but also function to cool the engine, suspend combustion byproducts to keep the engine clean, and prevent corrosion. Thus, lubricating oils used in internal combustion engines must have various properties. Examples of these properties include wear resistance, thermal stability, dispersibility, low evaporation, and good fuel efficiency.

In the meantime, engine and automobile manufacturers are making efforts to improve properties, for example, by increasing engine power and applying various features, not only to meet the ever-growing desires of users but also to address the demands arising from the era of energy transition. According to the investigation by the U.S. Environmental Protection Agency, as the power per unit displacement of automobiles increases, and engines become sophisticated, there is also a demand for lubricating oils used in such automobiles and engines to have further improved properties.

Additionally, recent demand for improving the fuel efficiency of automobiles and reducing carbon dioxide ($CO_2$) emissions has been increasing significantly to prevent global warming. To improve the fuel efficiency of such automobiles, it is important to make engines efficient. In the case of gasoline engines, lean burn technology or direct injection technology has been employed. In the case of diesel engines, extensive research has been conducted to improve fuel efficiency while reducing the amount of particulate matter (PM) in exhaust gas. It is commonly known that fuel efficiency can be improved by decreasing the low-temperature viscosity of engine oils or reducing engine friction. To this end, a wide range of research has been conducted.

Typically, lubricating oils include additives to help such lubricating oils have a specific viscosity at a predetermined temperature. The viscosity of lubricating oils is inversely proportional to temperature. This means that the viscosity of a lubricating oil decreases when the temperature of a lubricating oil increases, and the viscosity of a lubricating oil increases when the temperature of a lubricating oil decreases. However, during cold weather, it is desired that lubricating oils have a lower viscosity at lower temperatures to facilitate engines to start and have a higher viscosity at higher ambient temperatures when lubricating properties normally deteriorate. As such additives for lubrication, lubricating oil viscosity index improvers have been prepared.

Currently, olefin copolymers (OCPs), hydrogenated styrene-isoprene block polymers (HSPs), polymethacrylate (PMA), styrene-polyester (SPE), styrene-polybutylene (SPB), and the like are being primarily used as lubricating oil viscosity index improvers in the industries. Such viscosity index improvers allow lubricating oils to have a high viscosity index (VI), thus making the viscosity changes of lubricating oils with temperature changes small.

Typically, when a lubricating oil viscosity index improver has a high molecular weight, shear stability is reduced due to high shear conditions. There has been a recent trend that the molecular weight of lubricating oil viscosity index improvers increases because the pace at which lubricating oils are upgraded is accelerating. Thus, there is a growing demand d for lubricating oil compositions and lubricating oil viscosity index improvers having excellent shear stability in various industries.

In the meantime, Korean Patent Application Publication No. 10-2018-0080820 is presented as a similar document of related art.

DOCUMENT OF RELATED ART

Patent Document (Patent Document 1) Korean Patent Application Publication No. 10-2018-0080820 (2018 Jul. 13)

SUMMARY OF THE INVENTION

The present disclosure aims to provide a lubricating oil viscosity index improver having excellent shear stability and excellent high-temperature high-shear (HTHS) viscosity properties and a lubricating oil composition containing the same.

However, the above objectives are exemplary, and the technical ideas of the present disclosure are not limited thereto.

A first aspect of the present disclosure relates to a lubricating oil viscosity index improver containing a liquid alpha-olefin copolymer in which ethylene and an alpha-olefin monomer having 3 or more carbon atoms are copolymerized, wherein the liquid alpha-olefin copolymer is characterized by having a weight average molecular weight (Mw) in the range of 10,000 to 120,000 g/mol, a permanent shear stability index (PSSI) of greater than 1 and less than 25, and a thickening power of greater than 2.5 cSt and less than 3.6 cSt at a temperature of 100° C.

In the first aspect, the liquid alpha-olefin copolymer may be a copolymer in which an ethylene monomer and an alpha-olefin monomer having 3 to 6 carbon atoms are copolymerized.

In the first aspect, the liquid alpha-olefin copolymer may contain 40 to 60 mol % of an ethylene monomer and 60 to 40 mol % of an alpha-olefin monomer having 3 to 20 carbon atoms.

In the first aspect, the liquid alpha-olefin copolymer may have a specific gravity in the range of 0.8 to 0.95 at a temperature of 20° C.

In the first aspect, the liquid alpha-olefin copolymer may have a viscosity index (VI) in the range of 130 to 150 when being diluted in a base oil to a concentration of 5 wt %.

In the first aspect, the liquid alpha-olefin copolymer more preferably has an Mw in the range of 20,000 to 80,000 g/mol, in which case the PSSI may be in the range of 1.5 to 3.5.

A second aspect of the present disclosure relates to a lubricating oil composition characterized by containing a base oil and the aforementioned lubricating oil viscosity index improver.

In another aspect, the lubricating oil composition may contain 0.1 to 15 wt % of the lubricating oil viscosity index improver and the remainder being the base oil.

In the second aspect, the lubricating oil composition may be for use in a gasoline engine oil. In this case, the lubricating oil composition may have a mini-rotary viscometer (MRV) viscosity in the range of 15,000 to 19,000 cP at a temperature of −35° C., a cold cranking simulator (CCS) viscosity of 7,000 cP or less at a temperature of −30° C., a viscosity loss rate of 2% or less at a temperature of 100° C. after 30 cycles of shear in a Bosch pump, and a viscosity loss rate of 3% or less at a temperature of 40° C. after 30 cycles of shear in a Bosch pump.

In the second aspect, the lubricating oil composition may be for use in a heavy-duty diesel engine oil. In this case, the lubricating oil composition may have an MRV viscosity in the range of 19,000 to 30,000 cP at a temperature of −30° C., a CCS viscosity of 9,000 cP or less at a temperature of −25° C., a viscosity loss rate of 6% or less at a temperature of 100° C. after 90 cycles of shear in a Bosch pump, and a viscosity loss rate of 5% or less at a temperature of 40° C. after 90 cycles of shear in a Bosch pump.

A lubricating oil viscosity index improver, according to the present disclosure, contains a liquid alpha-olefin copolymer having an Mw in the range of 10,000 to 120,000 g/mol, a PSSI of greater than 1 and less than 25, and a thickening power of greater than 2.5 cSt and less than 3.6 cSt at a temperature of 100° C. and thus can have further excellent shear stability and HTHS viscosity properties. Accordingly, a lubricating oil composition containing the lubricating oil viscosity index improver is advantageous in that the viscosity can be maintained stably in high-temperature and high-shear environments to reduce metal wear between engine parts, thus improving the durability of engines, and also, fuel consumption can be reduced through friction reduction in the engine parts, thus improving fuel efficiency.

DESCRIPTION OF THE PREFERRED EMBODIMENTS

Advantages and features of embodiments of the present disclosure, and methods to achieve those will become clear with reference to the following embodiments described in detail. However, the present disclosure is not limited to the embodiments set forth below and can be implemented in many different forms. The following embodiments are provided only to completely disclose the present disclosure and inform those skilled in the art of the scope of the present disclosure. In addition, the present disclosure is defined only by the scope of the appended claims. Like reference numerals are used throughout the specification to indicate like components.

In describing the embodiments of the present disclosure, if it is determined that a detailed description of a related known function or configuration may unnecessarily obscure the gist of the present disclosure, the detailed description thereof will be omitted. In addition, the terms to be described below are defined in consideration of functions in the present disclosure, which may vary depending on a user, an operator's intention or practice, or the like. Thus, these terms should be defined based on the content throughout the entire specification.

A first aspect of the present disclosure relates to a lubricating oil viscosity index improver containing a liquid alpha-olefin copolymer in which ethylene and alpha-olefin monomers having 3 or more carbon atoms are copolymerized, wherein the liquid alpha-olefin copolymer is characterized by having a weight average molecular weight (Mw) in the range of 10,000 to 120,000 g/mol, a permanent shear stability index (PSSI) of greater than 1 and less than 25, and a thickening power of greater than 2.5 cSt and less than 3.6 cSt at a temperature of 100° C.

Such a lubricating oil viscosity index improver, according to the present disclosure, contains the liquid alpha-olefin copolymer having an Mw in the range of 10,000 to 120,000 g/mol, a PSSI of greater than 1 and less than 25, and a thickening power of greater than 2.5 cSt and less than 3.6 cSt at a temperature of 100° C., and thus may have further excellent shear stability and high-temperature high-shear (HTHS) viscosity properties. Accordingly, a lubricating oil composition containing the lubricating oil viscosity index improver is advantageous in that the viscosity may be maintained stably in high-temperature and high-shear environments to reduce metal wear between engine parts, thus improving the durability of engines, and also, fuel consumption may be reduced through friction reduction in the engine parts, thus improving fuel efficiency.

In one example of the present disclosure, the liquid alpha-olefin copolymer is configured to improve the viscosity of a lubricating oil. As described above, the liquid alpha-olefin copolymer, according to the disclosure, may have an Mw in the range of 10,000 to 120,000 g/mol, which is more preferably in the range of 15,000 to 100,000 g/mol and even more preferably in the range of 20,000 to 80,000 g/mol. Within such a range, excellent shear stability and HTHS viscosity properties may be achieved.

In addition, as described above, the liquid alpha-olefin copolymer, according to the present disclosure, may have a PSSI of greater than 1 and less than 25, which is more preferably in the range of 1.3 to 15, even more preferably in the range of 1.5 to 10, still more preferably in the range of 1.5 to 5, and most preferably in the range of 1.5 to 3.5. Furthermore, the thickening power at a temperature of 100° C. may be greater than 2.5 cSt and less than 3.6 cSt, which is more preferably in the range of 2.6 to 3.5, even more preferably in the range of 2.7 to 3.4, and most preferably in the range of 2.8 to 3.3. Within such a range, excellent shear stability and HTHS viscosity properties may be achieved.

Moreover, the liquid alpha-olefin copolymer, according to the present disclosure, may have a specific gravity in the range of 0.8 to 0.95 at a temperature of 20° C., which is more preferably in the range of 0.82 to 0.92, even more preferably in the range of 0.85 to 0.90, and most preferably in the range of 0.86 to 0.87. Within such a range, the lubricating oil viscosity index improver may be mixed further well with a base oil when being mixed in a lubricating oil composition.

In addition, the liquid alpha-olefin copolymer may have a viscosity index (VI) in the range of 130 to 150 when being diluted in the base oil to a concentration of 5 wt %, which is more preferably in the range of 130 to 140, even more preferably in the range of 131 to 138, and most preferably in the range of 133 to 137. Within such a range, the viscosity may be kept from becoming excessively low even at high temperatures and becoming excessively high even at low temperatures due to being less sensitive to temperature changes.

In the meantime, the liquid alpha-olefin copolymer, according to one example of the present disclosure, may be a copolymer prepared by copolymerization of ethylene monomers and alpha-olefin monomers other than ethylene. The alpha-olefin monomer may be an aliphatic olefin having 3 to 20 carbon atoms and, specifically, may one or more selected from propylene, 1-butene, 1-pentene, 3-methyl-1-butene, 1-hexene, 4-methyl-1-pentene, 3-methyl-1-pentene, 1-heptene, 1-octene, 1-decene, 1-dodecene, 1-tetradecene, and the like. Preferably, the liquid alpha-olefin copolymer is a copolymer in which ethylene monomers and alpha-olefin monomers having 3 to 6 carbon atoms are copolymerized, in which case the alpha-olefin monomer may be one or more selected from propylene, 1-butene, 1-pentene, 3-methyl-1-butene, 1-hexene, 4-methyl-1-pentene, 3-methyl-1-pentene, and the like, and most preferably, is propylene.

The liquid alpha-olefin copolymer suitable for the present disclosure preferably contains 40 to 60 mol % of ethylene monomers and 60 to 40 mol % of alpha-olefin monomers having 3 to 20 carbon atoms and, more preferably, contains 45 to 55 mol % of ethylene monomers and 55 to 45 mol % of alpha-olefin monomers having 3 to 20 carbon atoms. Using the liquid alpha-olefin copolymer within such a composition range is advantageous in improving friction reduction properties.

In the meantime, the liquid alpha-olefin copolymer may be polymerized using a metallocene catalyst composition. Specifically, the metallocene catalyst composition may, for example, include (A) a crosslinked metallocene compound, and (B) at least one compound selected from:

(b-1) an organoaluminum oxy compound, (b-2) a compound that reacts with (A) the crosslinked metallocene compound to form an ion pair, and (b-3) an organoaluminum compound that activates (b-2) the compound that reacts with (A) the crosslinked metallocene compound to form the ion pair.

This leads to high polymerization activity, previously unattainable, so polymers having high molecular weight can be obtained. In addition, the comonomer content is high, the molecular weight distribution is narrow, and the distribution of double bonds is low, so a liquid alpha-olefin copolymer having excellent thermal stability and durability can be prepared.

In one example of the present disclosure, (A) the cross-linked metallocene compound may be a compound represented by Formula 1 below.

[Formula 1]

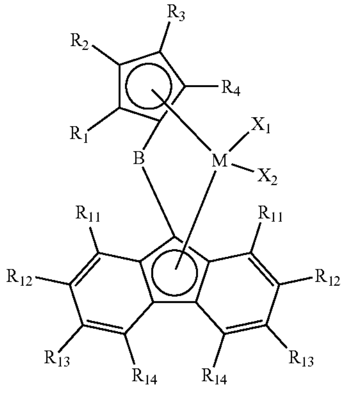

(In Formula 1,

M may be one or more transition metals selected from the group consisting of titanium, zirconium, and hafnium, B may be a linking group such as an alkylene group having 1 to 20 carbon atoms, an arylene group having 6 to 20 carbon atoms, dialkyl silicon having 1 to 20 carbon atoms, dialkyl germanium having 1 to 20 carbon atoms, an alkylphosphine group having 1 to 20 carbon atoms, or an alkylamine group having 1 to 20 carbon atoms, or may be in a linking group-free form, $X_1$ and $X_2$ may each independently be a halogen atom, an alkyl group having 1 to 20 carbon atoms, an alkenyl group having 2 to 20 carbon atoms, an alkynyl group having 2 to 20 carbon atoms, an aryl group having 6 to 20 carbon atoms, an alkylaryl group having 7 to 40 carbon atoms, an arylalkyl group having 7 to 40 carbon atoms, an alkylamido group having 1 to 20 carbon atoms, an arylamido group having 6 to 20 carbon atoms, an alkylidene group having 1 to 20 carbon atoms, or an alkoxy group having 1 to 20 carbon atoms, and $R_1$ to $R_{14}$ may each independently be hydrogen, an alkyl group having 1 to 20 carbon atoms, an alkenyl group having 2 to 20 carbon atoms, an aryl group having 6 to 20 carbon atoms, an alkylaryl group having 7 to 20 carbon atoms, an arylalkyl group having 7 to 20 carbon atoms, a cycloalkyl group having 5 to 60 carbon atoms, a heterocyclic group having 4 to 20 carbon atoms, an alkynyl group having 1 to 20 carbon atoms, or a hetero or silyl group containing an aryl group having 6 to 20 carbon atoms.)

In one example of the present disclosure, (b-1) the organoaluminum oxy compound may be one or more compounds selected from the group consisting of Formulas 2 to 5 below.

[Formula 2]

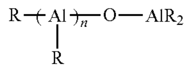

[Formula 3]

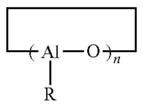

(In Formulas 2 and 3, R is a hydrocarbon group having 1 to 10 carbon atoms, and n is an integer of 2 or more.)

In Formula 2 or 3, the organoaluminum oxy compound in which R is a methyl group may be referred to as methylaluminoxane, in which case n is an integer of 3 or more and, preferably, 10 or more.

Although methylaluminoxane is an organoaluminum oxy compound that has been widely used in the polyolefin industry from the viewpoint of being easily obtainable and having high polymerization activity, methylaluminoxane is difficult to dissolve in saturated hydrocarbons. For this reason, there have been some cases where methylaluminoxane is inevitably used as a solution for aromatic hydrocarbons, such as toluene and benzene, that pose a significant environmental burden. Under these circumstances, methylaluminoxane elastomer dissolvable in saturated hydrocarbons have been developed. Examples of such analogues include methylaluminoxane of Formula 4 as shown below. (b-1) The organoaluminum oxy compound involved in the high-temperature solution polymerization method of the present disclosure also includes methylaluminoxane of such a formula.

[Formula 4]

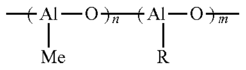

(In Formula 4, R represents a hydrocarbon group having 2 to 20 carbon atoms, and m and n represent integers of 2 or more.)

The methylaluminoxane represented by Formula 4 is formulated using trimethylaluminum and alkyl aluminum other than trimethylaluminum. Those formulated using trimethylaluminum and triisobutylaluminum by manufacturers such as Tosoh, FineChem, and the like, in which R is an isobutyl group, are currently available and produced under the trade names such as MMAO and TMAO.

In addition, examples of the organoaluminum oxy compound used in the present disclosure may include a boron-containing organoaluminum oxy compound represented by Formula 5 below.

[Formula 5]

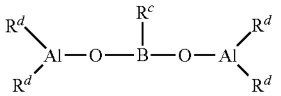

(In Formula 5, $R^c$ represents a hydrocarbon group having 1 to 10 carbon atoms, and $R^d$, each of which may be the same or different from each other, represents a hydrogen atom, a halogen atom, or a hydrocarbon group having 1 to 10 carbon atoms.)

In (b-1) the organoaluminum oxy compound described above, some organoaluminum compounds may be mixed.

In one example of the present disclosure, (b-2) the compound that reacts with (A) the crosslinked metallocene compound to form the ion pair is also referred to as an ionic compound, and examples thereof may include Lewis acids, ionic compounds, borane compounds, carborane compounds, and the like. In addition, other examples thereof may include heteropoly compounds and isopoly compounds.

In the present disclosure, the ionic compound preferably employed is a compound represented by Formula 6 below. Sludge production is reduced because the amount of such ionic compounds used is smaller than that of organoaluminum oxy compounds, which is economically advantageous.

[Formula 6]

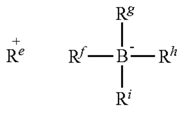

(In Formula 6, examples of $R^{e+}$ may include $H^+$, a carbenium cation, an oxonium cation, an ammonium cation, a phosphonium cation, a cycloheptyltrienyl cation, a transition metal-containing ferrocenium cation, and the like. $R^f$, $R^g$, $R^h$, and $R^i$, each of which may be the same or different from each other, are an organic group and, preferably, are an aryl group.)

Specific examples of the carbenium cation may include a dimethylanilinium cation and the like.

In one example of the present disclosure, examples of (b-3) the organoaluminum compound may include organoaluminum represented by Formula 7 below, an alkyl complex compound of aluminum and metal in group 1, represented by Formula 8 below, and the like.

[Formula 7]

$$R^a_m Al\,(OR^b)_n H_p X_q$$

(In Formula 7, $R^a$ and $R^b$, each of which may be the same or different from each other, represent a hydrocarbon group having 1 to 15 carbon atoms, which preferably has 1 to 4 carbon atoms, X represents a halogen atom, m is a number in the range of $0<m\leq3$, n is a number in the range of $0\leq n<3$, p is a number in the range of $0<p\leq3$, q is a number in the range of $0\leq q<3$, and also $m+n+p+q=3$.)

[Formula 8]

$$M_2AlR_4^a$$

(In Formula 8, $M_2$ represents Li, Na, or K, and $R^a$ represents a hydrocarbon group having 1 to 15 carbon atoms, which preferably has 1 to 4 carbon atoms.)

The compound represented by Formula 8 is an alkyl complex compound of aluminum and metal in group 1 of the periodic table, and examples thereof may include $LiAl(C_2H_5)_4$, $LiAl(C_7H_{15})_4$, and the like.

In addition, compounds similar to the compound represented by Formula 8 may also be used, and examples thereof may include organoaluminum compounds in which two or more aluminum compounds are bonded via nitrogen atoms. Specific examples of such compounds may include $(C_2H_5)_2AlN(C_2H_5)Al(C_2H_5)_2$ and the like.

From the viewpoint of being easily obtainable, trimethylaluminum and triisobutylaluminum are preferably used as (b-3) the organoaluminum compound.

In addition, a second aspect of the present disclosure lubricating oil composition containing the relates to a aforementioned lubricating oil viscosity index improver and, specifically, relates to a lubricating oil composition characterized by containing a base oil and the aforementioned lubricating oil viscosity index improver.

As described above, the lubricating oil composition, according to the present disclosure, contains the lubricating oil viscosity index improver containing the liquid alpha-olefin copolymer having an Mw in the range of 10,000 to 120,000 g/mol, a PSSI of greater than 1 and less than 25, and a thickening power of greater than 2.5 cSt and less than 3.6 cSt at a temperature of 100° C. Accordingly, the lubricating oil composition is advantageous in that viscosity may be maintained stably in high-temperature and high-shear environments to reduce metal wear between engine parts, thus improving the durability of engines, and also, fuel consumption may be reduced through friction reduction in the engine parts, thus improving fuel efficiency.

In more detail, the lubricating oil composition, according to one example of the present disclosure, may be for use in an automotive engine oil. Specifically, the lubricating oil composition may, for example, be for use in a gasoline engine oil or a heavy-duty diesel engine oil.

When the lubricating oil composition is for use in the gasoline engine oil, the lubricating oil composition may have a mini-rotary viscometer (MRV) viscosity in the range of 15,000 to 19,000 cP at a temperature −35° C., which is more preferably in the range of 15,500 to 18,800 cP, even more preferably in the range of 16,000 to 18,500 cP, still more preferably in the range of 16,500 to 18,300 cP, and most preferably in the range of 17,000 to 18,000 cP. On the other hand, when the MRV viscosity is less than 15,000 cP, starting performance and pumpability at low temperatures may be excellent, but engine protection performance under high-temperature and high-load conditions may be poor. When the MRV viscosity is greater than 19,000 cP, the lubricating oil composition may fail to flow sufficiently at low temperatures, resulting in problems with pump operation, and the lubrication effects may be poor, which is undesirable. In addition, the lubricating oil composition may have a cold cranking simulator (CCS) viscosity of 7,000 cP or less at a temperature of −30° C., which is more preferably in the range of 4,000 to 7,000 cP, even more preferably in the range of 4,600 to 6,500 cP, still more preferably in the range of 5,000 to 6,800 cP, and most preferably in the range of 5,200 to 6,500 cP. On the other hand, when the CCS viscosity is greater than 7,000 cP, the lubricating oil composition may be extremely sticky at low temperatures, making it difficult for engines to start. When the CCS viscosity is less than 4,000 cP, the oil may be extremely watery, so a sufficiently thick lubricating film may fail to be formed at low temperatures. In addition, engine parts may fail to be protected sufficiently under high-temperature and high-load conditions, resulting in problems with durability. Furthermore, the lubricating oil composition may have a viscosity loss rate of 2% or less at a temperature of 100° C. after 30 cycles of shear in a Bosch pump. Moreover, the lubricating oil composition may have a viscosity loss rate of 3% or less at a temperature of 40° C. after 30 cycles of shear in a Bosch pump. The shear force generated due to obtaining such excellent shear stability when an engine is running prevents the viscosity of the lubricating oil composition from easily changing, so the lubrication performance may remain stable for a long period of time. In this case, the lower limit of the viscosity loss rate is not particularly limited. However, the lower limit of the viscosity loss rate at each temperature of 100° C. or 40° C. after 30 cycles of shear in the Bosch pump may be 0.1%.

In addition, when the lubricating oil composition is for use in the heavy-duty diesel engine oil, the lubricating oil composition may have an MRV viscosity in the range of 19,000 to 30,000 cP at a temperature −30° C., which is more preferably in the range of 20,000 to 28,000 cP and even more preferably in the range of 24,000 to 26,000 cP. On the other hand, when the MRV viscosity is less than 19,000 cP, a lubricating film may fail to be sufficiently formed, and engine protection performance may be poor, which is problematic. When the MRV viscosity is greater than 30,000 cP, pumpability and starting performance at low temperatures may be poor, resulting in problems when engines start. In addition, the lubricating oil composition may have a CCS viscosity of 9,000 cP or less at a temperature of −25° C., which is more preferably in the range of 5,000 to 9,000 cP, even more preferably in the range of 5,500 to 8,500 cP, still more preferably in the range of 6,000 to 8,000 cP, and most preferably in the range of 6,300 to 7,500 cP. On the other hand, when the CCS viscosity is greater than 9000 cP, the lubricating oil composition may be extremely sticky at low temperatures, making it difficult for engines to start. When the CCS viscosity is less than 5,000 cP, the oil may be extremely watery, so a sufficiently thick lubricating film may fail to be formed at low temperatures. In addition, engine parts may fail to be protected sufficiently under high-temperature and high-load conditions, resulting in problems with durability. Furthermore, the lubricating oil composition may have a viscosity loss rate of 6% or less at a temperature of 100° C. after 90 cycles of shear in a Bosch pump. Moreover, the lubricating oil composition may have a viscosity loss rate of 5% or less at a temperature of 40° C. after 90 cycles of shear in a Bosch pump. The shear force generated due to obtaining such excellent shear stability when an engine is running prevents the viscosity of the lubricating oil composition from easily changing, so the lubrication performance may remain stable for a long period of time. In this case, the lower limit of the viscosity loss rate is not particularly limited. However, the lower limit of the viscosity loss rate at each temperature of 100° C. or 40° C. after 90 cycles of shear in the Bosch pump may be 0.1%.

To promote these excellent properties, the amount of each component constituting the lubricating oil composition is important. As described above, the lubricating oil composition, according to one example of the present disclosure, may contain 0.1 to 15 wt % of the lubricating oil viscosity index improver and the remainder being the base oil. The lubricating oil composition more preferably contains 1 to 12 wt % of the lubricating oil viscosity index improver, which is even more preferably in the range of 3 to 11 wt %, still more preferably in the range of 5 to 10 wt %, and particularly preferably in the range of 6.5 to 8 wt %, and the balance being the base oil. Within such a range, desired levels of shear stability and HTHS viscosity properties may be satisfied, which is desirable.

Hereinafter, the lubricating oil composition, according to one example of the present disclosure, will be described in more detail.

First, in one example of the present disclosure, although properties, such as viscosity properties, heat resistance, or oxidation stability, may vary depending on preparation methods or purification methods, the base oil is available without particular limitation as long as it is commonly used in the art. In general, the American Petroleum Institute (API) classifies base oils into five groups: I, II, III, IV, and V. These API categories, defined in API Publication 1509, 15th Edition, Appendix E, April 2002, are as shown in Table 1 below.

TABLE 1

| | Saturated hydrocarbon (%) | Sulfur (%) | VI |
|---|---|---|---|
| Group I | <90 | >0.03 | 80 ≤ VI < 120 |
| Group II | ≥90 | ≤0.03 | 80 ≤ VI < 120 |
| Group III | ≥90 | ≤0.03 | VI ≥ 120 |
| Group IV | Polyalphaolefin (PAO) | | |
| Group V | Ester and others | | |

The base oil is preferably any of Groups I to V of the API categories. Base oils suitable for the present disclosure are those belonging to Groups I to III of the API categories described above, in which case the “saturated hydrocarbon” may refer to paraffinic and naphthenic compounds. Paraffinic compounds may be branched-chain or straight-chain, and naphthenic compounds may be cyclic saturated hydrocarbons, that is, cycloparaffins. Saturated hydrocarbons having a cyclic structure are typically derivatives of cyclopentane or cyclohexane. Naphthenic compounds include a single ring structure (mononaphthene), two isolated ring structures (isolated dinaphthene), two fused ring structures (fused dinaphthene), or three or more fused ring structures (polycyclic naphthenes or polynaphthenes).

Furthermore, the lubricating oil composition, according to one example of the present disclosure, may further include additives in the art that are commonly added. Specifically, the lubricating oil composition may, for example, include one or more selected from the group consisting of pour point depressants (PPD), oxidation inhibitors, corrosion inhibitors, friction modifiers, foam inhibitors, anti-wear agents, dispersants, and the like. These additives may be each independently added in an amount in the range of 0.001 to 10 wt %, but such amounts are not necessarily limited thereto.

Hereinafter, the present disclosure will be described in detail through examples and comparative examples. The following examples are only to help an understanding of the present disclosure, and the scope of the present disclosure is not limited by the following examples. Unless particularly specified otherwise, % may refer to wt %.

[Property Evaluation Method]

Each property of a liquid alpha-olefin copolymer and a lubricating oil composition was tested according to the following methods.

1) Liquid Alpha-Olefin Copolymer:

a) Mw (g/mol): The Mw was measured according to ASTM D5296.

b) Viscosity (at 100° C., cSt): The viscosity at a temperature of 100° C. was measured according to ASTM D445.

c) Specific gravity: The specific gravity at a temperature of 20° C. was measured according to ASTM D1480.

d) PSSI and viscosity loss rate: The PSSI and viscosity loss rate were measured according to ASTM D6278.

e) Thickening power (at 100° C., cSt): The thickening power at a temperature of 100° C. was measured according to ASTM D445.

f) VI: The liquid alpha-olefin copolymer was diluted in a base oil to a concentration of 5 wt %, and the VI was measured according to ASTM D2270.

2) Lubricating Oil Composition:

a) Kinematic viscosity (cSt): The kinematic viscosity at a temperature of 40° C. ($V_{40}$) and the kinematic viscosity at a temperature of 100° C. ($V_{100}$) were measured according to ASTM D445.

b) VI: The VI was measured according to ASTM D2270.

c) CCS viscosity (cP): The CCS viscosity at a temperature of −25° C. or −30° C. was measured using a CSS viscometer according to ASTM D5293.

d) MRV viscosity (cP): The MRV viscosity at a temperature of −30° C. or −35° C. was measured according to ASTM D4684.

e) HTHS viscosity (cP): The HTHS viscosity at a temperature of 150° C. was measured using an HTHS viscometer according to ASTM D5481.

f) Pour point (° C.): The pour point was measured using a pour point apparatus according to ASTM D97.

g) Noack Volatility (wt %): The Noack volatility was measured at a temperature of 250° C. using a Noack evaporation loss tester (Noack volatility tester) according to ASTM D5800.

h) PSSI and viscosity loss rate: The PSSI and viscosity loss rate were measured according to ASTM D6278.

[Preparation Examples 1 and 2 and Comparative Preparation Examples 1 and 2] Synthesis of Liquid Alpha-Olefin Copolymer 1) Preparation of Catalyst Solution First, 0.15 mmol of diphenylmethylene{η5-(3-n-butylcyclopentadienyl)}{η5-(2,7-di-tert-butylfluorenyl)}zirconium dichloride, 0.2 mmol of dimethylanilinium tetra(pentafluorophenyl)boron, 8 mmol of triisobutylaluminum, and toluene were mixed in a glass flask thoroughly purged with nitrogen, thereby preparing 120 mL of a catalyst solution.

2) Polymerization

Next, 375 mL of hexane was injected into an internal-volume stainless steel autoclave (internal volume: 1.1 L) thoroughly purged with nitrogen, and the temperature in this system was raised to 70° C., followed by adding 15 mL of the catalyst solution prepared above. Then, ethylene at 260 g/hr, liquid propylene at 12.40 mL/min, hydrogen at 1.95 g/hr, hexane at 30 mL/min, and the catalyst solution at 0.25 mL/min were continuously introduced, and the stirring rotation speed was maintained at 1630 rpm to initiate copolymerization. Subsequently, the catalyst input was reduced so that the catalyst was ultimately introduced continuously at 0.07 mL/min, thereby conducting polymerization while maintaining the temperature at 100° C. and the pressure at 16 Bar. The resulting copolymer solution was released continuously by a back pressure regulator and mixed with a 1 M sodium hydroxide aqueous solution for activation.

3) Post-Polymerization Process

From the resulting mixture of the polymer solution and the sodium hydroxide aqueous solution, the sodium hydroxide aqueous solution was removed, followed by extracting impurities from the polymer solution with distilled water. The polymer solution was then concentrated under reduced pressure at a temperature of 100° C. for 30 minutes and dried under reduced pressure at a temperature of 230° C. for 30 minutes. As a result, 435 g of ethylene-propylene copolymers were obtained. A base oil was mixed in the resulting polymer so that this polymer was diluted to a kinematic viscosity of 1250 cSt at a temperature of 100° C., thereby obtaining a final product.

[Property Evaluation of Liquid Alpha-Olefin Copolymer]

The key physical properties of the liquid alpha-olefin copolymers prepared above were measured. The results thereof are shown in Table 2 below. In addition, the PSSI (at 100° C.) and viscosity loss (at 100° C.) of the liquid alpha-olefin copolymers were measured according to ASTM D6278. The respective results thereof are shown in Tables 3 and 4 below. In this case, a currently available product (trade name: Infineum SV261L, hydrogenated styrene-diene copolymers, having an Mw of 650,000) was used as Comparative Preparation Example 3 shown in Tables 3 and 4 below.

TABLE 2

| | Liquid alpha-olefin copolymer | | | |
|---|---|---|---|---|
| | Preparation Example 1 | Preparation Example 2 | Comparative Preparation Example 1 | Comparative Preparation Example 2 |
| Mw | 65,000 | 39,000 | 14,000 | 174,000 |
| Viscosity (at 100° C., cSt) | 1,250 | 1,204 | 1,951 | 1,250 |
| Specific gravity (at 20° C.) | 0.861 | 0.863 | 0.855 | 0.870 |
| PSSI | 2.5 | 2.0 | 1.0 | 25.0 |
| Thickening power (at 100° C., cSt) | 2.9 | 3.2 | 3.6 | 2.5 |
| VI | 133 | 137 | 134 | 131 |

TABLE 3

| Shear stability index | Preparation Example 1 | Comparative Preparation Example 2 | Comparative Preparation Example 3 |
|---|---|---|---|
| 30 cycles | 1.8 | 21.9 | 22.8 |
| 60 cycles | 2.1 | 25.1 | 27.4 |
| 90 cycles | 4.2 | 27.1 | 34.1 |
| 120 cycles | 4.6 | 27.5 | 39.7 |
| 150 cycles | 5.3 | 27.1 | 49.3 |

Referring to Table 3, the PSSI value in the case of Preparation Example 1 is 5.3 even after 150 cycles of shear in a Bosch pump, meaning that the PSSI value does not increase significantly. On the other hand, there is a pattern that the PSSI value in the case of Comparative Preparation Example 2 increases sharply to 21.9 after 30 cycles of shear in a Bosch pump, and the PSSI value in the case of Comparative Preparation Example 3 also increases to 22.8, which is slightly higher than that in the case of Comparative Preparation Example 2, after 30 cycles of shear in a Bosch pump and increases sharply to 49.3 after 150 cycles of shear in a Bosch pump.

TABLE 4

| Viscosity loss (%) | Preparation Example 1 | Comparative Preparation Example 2 | Comparative Preparation Example 3 |
|---|---|---|---|
| 30 cycles | 0.6 | 7.1 | 8.1 |
| 60 cycles | 0.7 | 8.2 | 9.7 |
| 90 cycles | 1.5 | 8.8 | 12.0 |
| 120 cycles | 1.6 | 8.9 | 14.0 |
| 150 cycles | 1.9 | 8.8 | 17.4 |

Referring to Table 4, the viscosity loss in the case of Preparation Example 1 is significantly low at 1.9% after 150 cycles of shear in the Bosch pump. On the other hand, there is a pattern that the viscosity loss in the case of Comparative Preparation Example 2 increases significantly to 7.1% after 30 cycles of shear in the Bosch pump, and the viscosity loss in the case of Comparative Preparation Example 3 also increases to 8.1%, which is slightly higher than that in the case of Comparative Preparation Example 2, after 30 cycles of engine running and increases sharply to 17.4% after 150 cycles of shear in the Bosch pump.

[Examples 1 and 2 and Comparative Examples 1 and 2] Preparation of Lubricating Oil Composition A dispersant-inhibitor package (DI PKG), a PPD, each liquid alpha-olefin copolymer prepared above, a Group II mineral oil (150N, having a kinematic viscosity of 5.2 cSt at 100° C.), and a Group III mineral oil (having a kinematic viscosity of 4 cSt at 100° C.) were mixed according to the addition amounts (mass) shown in Table 5 below, thereby preparing a lubricating oil composition for use in a gasoline engine oil (5W30). Then, the physical properties of the lubricating oil composition were measured. The results thereof are shown in Table 7 below.

TABLE 5

| Gasoline engine oil (5W30) | | Example 1 | Example 2 | Comparative Example 1 | Comparative Example 2 |
|---|---|---|---|---|---|
| Composition (wt %) | DI PKG | 7.56 | 7.56 | 7.56 | 7.56 |
| | PPD | 0.40 | 0.40 | 0.40 | 0.40 |
| | Preparation Example 1 | 7.60 | — | — | — |
| | Preparation Example 2 | — | 6.82 | — | — |
| | Comparative Preparation Example 1 | — | — | 6.25 | — |
| | Comparative Preparation Example 2 | — | — | — | 8.60 |
| | Group II mineral oil | 40.00 | 40.50 | 41.35 | 39.00 |
| | Group III mineral oil | 44.44 | 44.44 | 44.44 | 44.44 |
| | Sum | 100.00 | 100.00 | 100.00 | 100.00 |

Example 3 and Comparative Example 3

A DI PKG, a PPD, each liquid alpha-olefin copolymer prepared above, a Group II mineral oil (150N, having a kinematic viscosity of 5.2 cSt at 100° C.), and a Group III mineral oil (having a kinematic viscosity of 6 cSt at 100° C.) were mixed according to the addition amounts (mass) shown in Table 6 below, thereby preparing a lubricating oil composition for use in a heavy-duty diesel engine oil (10W40). Then, the physical properties of the lubricating oil composition were measured. The results thereof are shown in Table 8 below.

TABLE 6

| Heavy-duty diesel engine oil (10W40) | | Example 3 | Comparative Example 3 |
|---|---|---|---|
| Composition (wt %) | DI PKG | 13.7 | 13.7 |
| | PPD | 0.3 | 0.3 |
| | Preparation Example 1 | 7.2 | — |
| | Comparative Preparation Example 2 | — | 8.2 |
| | Group II mineral oil | 38.8 | 37.8 |
| | Group III mineral oil | 40.0 | 40.0 |
| | Sum | 100.0 | 100.0 |

[Property Evaluation of Lubricating Oil Composition]

TABLE 7

| Gasoline engine oil (5W30) | | | Example 1 | Example 2 | Comparative Example 1 | Comparative Example 2 |
|---|---|---|---|---|---|---|
| Properties | Kinematic viscosity at 100° C. ($V_{100}$) | cSt | 10.4 | 10.3 | 10.4 | 10.4 |
| | Kinematic viscosity at 40° C. ($V_{40}$) | cSt | 60.8 | 60.7 | 62.3 | 60.6 |
| | VI | — | 160 | 159 | 155 | 162 |
| | CCS viscosity at −30° C. | cP | 5,581 | 6,378 | 8,341 | 4,524 |
| | MRV viscosity at −35° C. | cP | 17,937 | 17,784 | 19,106 | 17,869 |
| | HTHS viscosity at 150° C. | cP | 3.4 | 3.4 | 3.5 | 3.2 |
| | Pour point | ° C. | −45 | −45 | −44 | −43 |
| Bosch 30 cycle | Viscosity loss rate at 100° C. | % | 1.9 | 1.6 | 0.9 | 10.7 |
| | Viscosity loss rate at 40° C. | % | 2.3 | 2.0 | 1.3 | 11.8 |

Referring to Table 7, the lubricating oil compositions of Examples 1 and 2 contain the liquid alpha-olefin copolymers, according to the present disclosure, having an Mw in the range of 10,000 to 120,000 g/mol, a PSSI of greater than 1 and less than 25, and a thickening power of greater than 2.5 cSt and less than 3.6 cSt at a temperature of 100° C. Accordingly, it was confirmed that these lubricating oil compositions had excellent low-temperature performance because the CCS viscosity and the MRV viscosity thereof were lower than those in the case of Comparative Example 1 and had excellent viscosity retention performance because the viscosity loss rate thereof was significantly lower than that in the case of Comparative Example 2.

TABLE 8

| Heavy-duty diesel engine oil (10W40) | | | Example 3 | Comparative Example 3 |
|---|---|---|---|---|
| Properties | Kinematic viscosity at 100° C. ($V_{100}$) | cSt | 14.5 | 14.4 |
| | Kinematic viscosity at 40° C. ($V_{40}$) | cSt | 99.7 | 98.7 |
| | VI | — | 150 | 150 |
| | CCS viscosity at -25° C. | cP | 6,751 | 5,740 |
| | MRV viscosity at -30° C. | cP | 25,448 | 18,646 |
| | HTHS viscosity at 150° C. | cP | 4.3 | 4.1 |

TABLE 8-continued

| Heavy-duty diesel engine oil (10W40) | | | Example 3 | Comparative Example 3 |
|---|---|---|---|---|
| | Pour point | ° C. | −38 | −41 |
| | Noack volatility at 250° C. | wt % | 9.64 | 9.66 |
| Bosch 90 cycle | Kinematic viscosity at 100° C. ($V_{100}$) | cSt | 94.1 | 82.1 |
| | Kinematic viscosity at 40° C. ($V_{40}$) | cSt | 13.8 | 12.4 |
| | Viscosity loss rate at 100° C. | % | 5.6 | 16.8 |
| | Viscosity loss rate at 40° C. | % | 4.6 | 14.1 |
| | HTHS viscosity at 150° C. | cP | 4.2 | 3.7 |

Referring to Table 8, the lubricating oil composition of Example 3 contains the liquid alpha-olefin copolymers, according to the present disclosure, having an Mw in the range of 10,000 to 120,000 g/mol, a PSSI of greater than 1 and less than 25, and a thickening power of greater than 2.5 cSt and less than 3.6 cSt at a temperature of 100° C. Accordingly, it was confirmed that this lubricating oil composition had excellent high-temperature shear stability because the HTHS viscosity value thereof was higher than that in the case of Comparative Example 3 and had excellent viscosity retention performance because the viscosity loss rate thereof was significantly low.

What is claimed is:

1. A lubricating oil viscosity index improver comprising a liquid alpha-olefin copolymer in which ethylene and an alpha-olefin monomer having 3 or more carbon atoms are copolymerized, wherein the liquid alpha-olefin copolymer has a weight average molecular weight (Mw) in a range of 10,000 to 120,000 g/mol, a permanent shear stability index (PSSI) of greater than 1 and less than 25, and a thickening power of greater than 2.5 cSt and less than 3.6 cSt at a temperature of 100° C., and wherein the liquid alpha-olefin copolymer has a specific gravity in a range of 0.8 to 0.95 at a temperature of 20° C.

2. The lubricating oil viscosity index improver of claim 1, wherein the liquid alpha-olefin copolymer is a copolymer in which ethylene and an alpha-olefin monomer having 3 to 6 carbon atoms are copolymerized.

3. The lubricating oil viscosity index improver of claim 1, wherein the liquid alpha-olefin copolymer comprises 40 to 60 mol % of an ethylene monomer and 60 to 40 mol % of an alpha-olefin monomer having 3 to 20 carbon atoms.

4. The lubricating oil viscosity index improver of claim 1, wherein the liquid alpha-olefin copolymer has a viscosity index (VI) in a range of 130 to 150 when being diluted in a base oil to a concentration of 5 wt %.

5. The lubricating oil viscosity index improver of claim 1, wherein the liquid alpha-olefin copolymer has an Mw in a range of 20,000 to 80,000 g/mol.

6. The lubricating oil viscosity index improver of claim 5, wherein the liquid alpha-olefin copolymer has a PSSI in a range of 1.5 to 3.5.

7. A lubricating oil composition comprising:

a base oil; and the lubricating oil viscosity index improver of claim 1.

8. The lubricating oil composition of claim 7, wherein the lubricating oil composition comprises 0.1 to 15 wt % of the lubricating oil viscosity index improver and the remainder being the base oil.

9. The lubricating oil composition of claim 7, wherein the lubricating oil composition is for use in a gasoline engine oil.

10. The lubricating oil composition of claim 9, wherein the lubricating oil composition has a mini-rotary viscometer (MRV) viscosity in a range of 15,000 to 19,000 cP at a temperature of −35° C.

11. The lubricating oil composition of claim 9, wherein the lubricating oil composition has a cold cranking simulator (CCS) viscosity of 7,000 cP or less at a temperature of −30° C.

12. The lubricating oil composition of claim 9, wherein the lubricating oil composition has a viscosity loss rate of 2% or less at a temperature of 100° C. after 30 cycles of shear in a Bosch pump.

13. The lubricating oil composition of claim 9, wherein the lubricating oil composition has a viscosity loss rate of 3% or less at a temperature of 40° C. after 30 cycles of shear in a Bosch pump.

14. The lubricating oil composition of claim 7, wherein the lubricating oil composition is for use in a heavy-duty diesel engine oil.

15. The lubricating oil composition of claim 14, wherein the lubricating oil composition has an mini-rotary viscometer (MRV) viscosity in a range of 19,000 to 30,000 cP at a temperature of −30° C.

16. The lubricating oil composition of claim 14, wherein the lubricating oil composition has a cold cranking simulator (CCS) viscosity of 9,000 cP or less at a temperature of −25° C.

17. The lubricating oil composition of claim 14, wherein the lubricating oil composition has a viscosity loss rate of 6% or less at a temperature of 100° C. after 90 cycles of shear in a Bosch pump.

18. The lubricating oil composition of claim 14, wherein the lubricating oil composition has a viscosity loss rate of 5% or less at a temperature of 40° C. after 90 cycles of shear in a Bosch pump.

* * * * *